United States Patent [19]

Bondoc et al.

[11] Patent Number: 5,717,012
[45] Date of Patent: Feb. 10, 1998

[54] SHEET FELT

[75] Inventors: Alfredo A. Bondoc, Somerset; Charles J. Horner, Jr., South Bound Brook, both of N.J.

[73] Assignee: Building Materials Corporation of America, Wayne, N.J.

[21] Appl. No.: 552,901

[22] Filed: Nov. 3, 1995

[51] Int. Cl.$^6$ .............................. C08L 1/02; C08L 9/08; C08K 3/40
[52] U.S. Cl. .............................. 524/13; 524/35; 524/494; 524/575
[58] Field of Search .............................. 524/13, 35, 494, 524/575

[56] References Cited

U.S. PATENT DOCUMENTS

| 4,269,657 | 5/1981 | Gomez et al. | 162/135 |
| 4,545,854 | 10/1985 | Gomez et al. | 162/135 |
| 4,609,431 | 9/1986 | Grose et al. | 162/135 |

*Primary Examiner*—Peter A. Szekely
*Attorney, Agent, or Firm*—Marilyn J. Maue; Walter Katz; Joshua J. Ward

[57] ABSTRACT

This invention concerns a light weight sheet felt material suitable for use as roof and siding underlayment and insulation board facing which comprises on a dry basis (a) 60–80 wt. % cellulose fibers;
(b) 15–30 wt. % glass fibers having a diameter of 5 to 16 microns and a length of ⅛–¾ inch;
(c) 4–10 wt. % binder and
(d) 0.5–10 wt. % non-asphaltic, sizing agent having a flash point above 150° F. and an evaporation rate less than one which is selected from the group consisting of anionic rosinous and amphipathic ester and anhydride sizes and mixtures thereof.

The felt of this invention is of considerably lighter weight and higher porosity than other felting materials used for the same purpose and can be supplied in longer continuous sheet rolls than heretofore practical from a standpoint of handling, shipping, storage, and installation. Also the present sheet felt can be produced on conventional felt making equipment in a one step process.

13 Claims, No Drawings

SHEET FELT

BACKGROUND OF THE INVENTION

The invention relates to felt sheeting suitable for use as siding and roofing underlayment or as facing for conventional closed cell foam insulation boards. Prior products for the same use are typically made from compositions of asphalt and cellulose/glass fiber of mixed length containing primarily glass fibers of ¼ inch length and 15–20 micron diameter. However, serious problems are encountered in the manufacture of such felts since asphalt, when added to the composition, gums in the equipment necessitating frequent shut downs for cleaning. Additionally, the low fiber aspect ratios (fiber length divided by fiber width), of the glass filaments in prior felts has led to glass fiber balling into objectionable lumps which disrupt sheet formation and decrease production rates.

Previously it was believed that glass fibers suitable for roofing and siding required a thickness of greater than 15 microns for strength and a length of ¼ inch or less for good porosity. However, it is now discovered that such fibers are brittle and form glass balls during dispersion in the felt making process.

Since it is common practice to wind felts produced in a felt mill in roll sizes suitable for handling and shipping, serious consideration must be given to the weight of the felt and convenience of the consumer. Thinner, more pliable rolls of greater length which avoid frequent patching and less waste are to be desired. Unfortunately, these aims have not been achieved without sacrifice of other desirable properties such as tear strength, low porosity and tensile strength.

Previous products also suffer from poor dimensional stability, i.e. a growth in product dimension when exposed to moist conditions due to cellulosic water absorption.

Accordingly, it is an object of this invention to provide a lighter weight sheeting felt suitable for roof and siding underlayment and insulation board facing which not only retains significant beneficial properties but which additionally achieves higher porosity, greater tear strength and better foam adhesion while overcoming the above disadvantages of equipment fouling and formation of glass balls.

Another object of the invention is to provide significant cost reduction in the commercial production of sheeting felts.

These and other objects and advantages will become apparent from the following description and disclosure.

THE INVENTION

In accordance with this invention there is provided a non-asphaltic sheeting felt composition and product consisting essentially of, on a dry basis, (a) 60–80 wt. % cellulose fibers;

(b) 15–30 wt. % glass fibers having a fiber diameter not in excess of 16.5 microns and a fiber length of ⅛ to ¾ inch;

(c) 4–10 wt. % binder for said fibers and (d) 0.5–10 wt. % non-asphaltic, sizing agent having a flash point above 150° F. and an evaporation rate less than one which is selected from the group of anionic rosinous sizes and amphiphathic sizes, e.g. $C_{16}$ to $C_{30}$ ester and anhydride sizes and mixtures thereof.

In a preferred embodiment, the binder is a SBR* latex, the cellulose fibers are derived from newspaper and corrugated kraft wastes containing at least 50% fibers of 1.5–3.5 millimeter length and 0.8–2.5 wt. % sizing agent. It is also desired that the sheeting composition contain glass fibers having a fiber aspect ratio of between 600 and 1450. The glass filament diameter of the present composition is critical to pliability and superior tear strength and the fiber length is critical to avoidance of glass ball formation during felt manufacture. Of the conventional glass filaments listed in following Table I, only those having a diameter between 5 and 16.5 microns, i.e. filaments D–M, are suitable for this invention. Although fiber M is usable, its greater thickness tends to increase brittleness and thus is subject to breakage during severe mixing conditions. Accordingly for fiber M, mild and shorter mixing periods are recommended in order to avoid lower fiber aspect ratios resulting from breakage. Filaments below class D are much more expensive to produce and do not possess the desired fiber strength for use in the present felts. Consequently, the diameter fibers of classes G–K are most preferred and fibers having a diameter between about 8.8 and about 14μ and a length of ⅛–¾ inch are preferred.

\* styrene and butadiene rubber latex

TABLE I

AVAILABLE FILAMENT DIAMETERS

| Filament Class | Diameter (microns) | | |
|---|---|---|---|
| | Min. | Avg. | Max. |
| A | 1.52 | 2.03 | 2.54 |
| B | 2.54 | 3.19 | 3.81 |
| C | 3.81 | 4.45 | 5.08 |
| D | 5.08 | 5.72 | 6.35 |
| E | 6.35 | 6.99 | 7.62 |
| F | 7.62 | 8.26 | 8.89 |
| G | 8.89 | 9.53 | 10.16 |
| H | 10.16 | 10.80 | 11.43 |
| J | 11.43 | 12.07 | 12.70 |
| K | 12.70 | 13.34 | 13.97 |
| L | 13.97 | 14.61 | 15.24 |
| M | 15.24 | 15.88 | 16.51 |
| N | 16.51 | 17.15 | 17.78 |
| O | 17.78 | 18.42 | 19.09 |
| P | 19.09 | 19.69 | 20.32 |
| Q | 20.32 | 20.96 | 21.59 |
| R | 21.59 | 22.23 | 22.86 |
| T | 22.86 | 23.50 | 24.13 |
| U | 24.13 | 24.77 | 25.40 |

An important beneficial aspect of the present invention is the low weight of the felt product, i.e. 15–23 lbs/480 square ft. By reducing the sheet weight and increasing the percentage of fiberglass, the amount of cellulose is appreciably reduced which provides a product of significantly improved dimensional stability. Weight reduction alone usually leads to an unacceptable decrease in tear strength. Unexpectedly, use of the present composition, with increased percentage of glass fibers, particularly the longer glass fibers, provides desirably high tear strength in the light weight sheet felt.

The present felt sheet is economically prepared by providing an aqueous slurry of the above composition (a)–(d), forming a sheet in a felting mill, pressing, draining and drying the resulting sheet for subsequent winding in a suitable roll size. Because of the lightness and pliability of the present sheeting material, larger roll sizes based on weight of 15 to 23 lbs/480 square feet can be easily handled; whereas most prior materials having a weight of 27 lbs. or more/480 square feet are limited to smaller roll sizes resulting in frequent seams and patching upon installation. As underlayment or as facings on a foamed core, the felt sheet thickness can vary between about 0.3 and about 4 mils although thicker sheets can be used for certain applications when desired. The benefits of increased feet per roll, e.g. an increase of up to 33% lineal feet per roll, are realized in reduced shipping costs and fewer production spicing for the consumer.

As facing for an insulation board, the rolled felt sheet of the invention, prepared on paper line, is sent to insulation manufacturing where a foam precursor chemical or chemicals are poured onto an unrolled lower facer of the felt sheeting. As the foam spreads it enters a laminator where it rises to contact the a restricted upper face of the felt sheeting and hardens thereon, after which the resulting sheet may be cut into boards. Due to the reduced thickness of the present felt sheeting, a significantly faster more even foam chemical flow is observed and an increased on-line curing rate through the thinner facer sheet is achieved. It is also observed that the higher porosity of the present felt sheeting provides significantly stronger adhesion to the foam core while avoiding appreciable bleed-through in highly functional cores such as those composed of polymeric isocyanate. Surprisingly, the thinner felt sheets, employing higher aspect ratio of glass fibers as herein described, provide significantly increased tear strength and up to 50% improved dimensional stability.

The felt of the invention is especially useful as felt facer for rigid foamed insulation boards such as are used in forming built-up roofing (BUR) on roof decks and as foam insulation sheathing used on siding. Such boards have a core of conventional rigid closed cell foam material, the cells of which normally contain hydrofluorocarbons or hydrocarbon gases. Depending upon the intended use, such boards normally have core thicknesses between about 25 and about 100 millimeters. Boards of the invention may be made in a conventional manner with the rigid foam preferably being formed and cured in contact with felt of the invention so that the resulting facing is continuously adhered to the rigid foam core. However, it is possible to form the core without a facing and then bond one or more facings to the core using suitable adhesives. In general, the teachings of U.S. Pat. No. 4,351,873, are applicable to the formation of rigid foam cores and adhesion of facer to at least one face of such cores. The distinguishing characteristic of insulation boards of the present invention is use of felt of the invention as a facer on conventional rigid foam cores. Polyurethane or polyisocyanurate foams are most commonly used although other foamable polymers known for use in such boards are also suitable. These include polyvinyl chlorides, urea formaldehydes and melamine polymers, polystyrene, polypropylene, polyethylene, epoxy resin, acrylonitrile-butadiene-styrene copolymer, cellulose acetate, etc. Rigid foam cores of this type are well known and are described in a number of patents including U.S. Pat. No. 4,351,873, the disclosure of which is incorporated herein by reference.

Generally, facers used on conventional foamed insulation boards have not been economical and tend to have weak foam core adhesion. This has resulted in various problems, especially in the manufacture of built-up roofing (BUR). In applications such as BUR, foamed insulation boards faced with conventional asphalt saturated felt are prone to warping due, at least in part, to facer dimensional instability and, when the board is mopped with hot asphaltic materials, the facer has been known to delaminate from the foam core. Conversely, when the felt product of this invention is used as a facer for a foamed insulation board, the insulation board is much less susceptible to warping at varying humidity conditions. Further, the present facer, having strong adhesion to the foam, is resistant to delamination under all conditions and particularly when the board is mopped with hot asphalt in a finishing process. Felt and insulation board products of this invention also have a wide sphere of application in roofing systems where material compatibility is necessary. For instance it is generally considered unacceptable to allow direct contact between insulation board faced with conventional asphalt-containing felt facers and a single ply polyvinylchloride roofing membrane due to plasticizer migration. The insulation board faced with felt of this invention presents no problems with respect to plasticizer migration since it contained no asphalt.

Further, conventional asphaltic felt facers of lower glass fiber aspect ratios which have been employed for insulation boards, have poorer fire resistance and do not retain sheet skeletal integrity when burnt; whereas insulation boards faced with felt of this invention have greatly improved fire resistance characteristics due to lower fuel value per unit area and greater sheet integrity after burning. These characteristics are especially desirable on facers of foamed insulation boards in BUR systems.

Additionally, conventional underlayment material of the asphaltic type is generally deficient in porosity and frequently does not allow desirably high transmission of water vapor needed to keep roof decking and underlying insulation dry. Surprisingly the product of the present invention will transmit water vapor at about 10 to 20 times the rate of conventional felt facer or underlayment material and at the same time will remain as impermeable with respect to liquid water as the conventional products.

A common problem in using foamed insulation boards, especially those with polyurethane or polyisocyanurate foamed cores faced with asphalt saturated felt facers, is that blistering of the facer can occur when it is mopped with hot asphalt at about 500° F. Such blistering takes the form of bubbles on the insulation board, thus enhancing the occurrence of delamination from the polyurethane foam. In the manufacture of urethane foam boards a very thin integral skin of polyurethane or polyisocyanurate is formed between the facer and the actual foam matrix. The blistering occurs underneath the skin where the expanded gases cannot escape into the atmosphere and thus forms bubbles. In the present invention such blistering can be eliminated by perforating the boards after manufacture, i.e. after the boards have been foamed and facers affixed. Such perforations are preferably in the form of small holes of about 0.02-0.1 inch diameter spaced apart from about ¼ inch to about 1½ inches on centers and should be of sufficient depth so that both the facer and the integral urethane skin are penetrated.

Cellulosic fibers suitable for use in products of this invention include any of the cellulosic fibers commonly used in making cellulosic felt of the type conventionally used as underlayment and facer for insulation boards and may include for instance fibers derived from wood, paper, rags, etc. For economic reasons waste paper such as waste newspaper, waste kraft corrugated paper, etc. is frequently employed. Blends of long and short cellulosic fibers are preferably used in order to provide felt of desired porosity. In this respect preferred blends contain between about 25 and about 75 wt. % short fibers with between about 25 and about 75 wt. % long fibers. Fibers of the type normally used in making newspaper are a suitable source of short fibers and fibers of the type normally employed in making kraft paper can be the source of long fibers. Suitable short fibers normally have lengths between about 0.5 and about 1.5 millimeters and long fibers normally have lengths between about 1.5 and about 3.5 millimeters.

The binder used for the felt of the invention is employed in amounts between about 4 and about 10 wt. % based on dry felt composition with between about 4 and about 6 wt. % on the same basis being preferred. Suitable binders include for instance acrylamides, starch, urea resins, phenol resins, sodium silicates, epoxy resins, etc. Other suitable binders include styrene/butadiene rubber (SBR) latex, as well as acrylic, neoprene, acrylonitrile or other natural or synthetic lattices. SBR latex is a preferred binder and, most desirably, is a carboxylated type of SBR latex substantially free of surfactants. One such preferred SBR latex is for instance one made by continuous monomer addition without the use of surfactant as taught for example by U.S. Pat. No. 4,378,272, and incorporated herein by reference. Such a latex not only functions as a binder for the felt of the invention but can also act as an ionic exchange resin to aid in relieving the build up of certain undesirable materials in a closed water system for felt manufacture. However, other binders such as those mentioned above may be substituted in whole or in part.

The sizing agent, which replaces the asphalt quota formerly employed in felt compositions, e.g. up to 20 wt. %, is bifunctional in that it supplies both body and waterproofing to the present felt composition. Suitable sizing agents have a flash point above 150° F. and are highly stable having an evaporation rate less than 1. More specifically, the sizing agent of the present composition is described in WET END CHEMISTRY, AN INTRODUCTION by William E. Scott, Chapter 4. "Internal Sizing", pages 23–27, published by TAPPI PRESS, 1992, which disclosure is incorporated herein by reference. The sizing agents disclosed in the text include acidic and alkaline, fortified, e.g. maleic anhydride fortified, and non-fortified organic sizing materials having a pH of from about 3.5 to about 10 and an acid number of from 0 to about 200, which materials have superior resistance to water penetration. The sizing component of the present invention is introduced into the composition as an aqueous dispersion, suspension, colloid or emulsion having a solids content of between about 30 and about 70%, preferably between about 40 and about 60%, and is present in the total composition of the preformed felt sheet at a concentration of from about 50% to about 80 wt. %, preferably from about 60 to about 70 wt. %.

Generally the sizing component is a mixture of an acidic compound, e.g. alum, and a rosin derived from gum, wood or tall oil. These rosins contain normal and isomeric mixtures of abletic and/or pimaric acids in a fortified or non-fortified condition. Other suitable sizing materials include amphipathic cellulose reactive compounds which contain $C_{16}$ to $C_{30}$ hydrocarbon chains such as, for example, an alkylketene dimer, an alkenyl succinic anhydride and mixtures of the above or intermixtures with rosin/alum. Commercially available ALPHASIZE®, supplied by American Cyanamid Co., is an example of a preferred anionic sizing agent employed in this invention. Alternatively, an alkaline component, can be substituted in whole or in part for the acidic component to provide cationic sizing agent suitable for the composition. Such sizing agents generally have a pH of from abut 7 to abut 10 and are resistant to acid and alkaline penetrants. However, these cationic agents are subject to deterioration and compositions containing them should not be stored over extended periods.

The sizing agent employed in the felt composition obviates fouling of equipment in the preparation of the felt and contributes to the lighter weight of the felt material, thus permitting end product rolls of significantly longer length. It is also observed that replacement of the conventional asphalt component with the present size unexpectedly provides for faster on-line production and more even and rapid spread of core compositions over the felt facing.

In addition to the required ingredients of the felt composition described above, other conventional adjuvants used in felt manufacture may also be included. For example conventional flocculants, defoaming agents, precipitants, etc. may be included. Illustrative of suitable flocculants are high molecular weight cationic acrylamide polymer such as Betz 1260, which may be used in amounts of between about ½ lb. and about 8 lbs. per ton of dry felt. Representative precipitants optionally employed herein include multivalent metal salts or synthetic polymers. Pigment may also be used for optional coloring of felt of the invention. A preferred pigment is carbon black which can be fixed onto the matrix of the felt with multivalent salts or polymeric flocculants. Desirably any pigment used should not leach out when the finished product is soaked in water for prolonged periods of time. Many other modifications and additions to the present felt sheet formulation will become apparent from this disclosure.

Having generally described the invention, reference is now had to the following examples which illustrate a preferred embodiment and compare the present composition with a conventional sheet felt composition. However, the example is not to be construed as limiting to the scope of the invention as more broadly described above and as defined in the appended claims.

EXAMPLE

Felt sheets are produced on a commercial paper making equipment by forming a felt sheet from an aqueous slurry of the following formulations (A and B), pressing the formed sheet and allowing the sheet to drain for about 3 minutes before drying at a temperature of about 300° C.

TABLE A

| FORMULATION | A | | B |
|---|---|---|---|
| Glass Fiber | | | |
| Diameter | M* | | K |
| Average fiber length (inch) | ¼ | | ½ |
| | WEIGHT PERCENT | | |
| Glass fiber | 13.0 | ∓1 | 18.0 |
| Waste Newsprint | 39.5 | ∓2 | 37.0 |
| Waste Kraft corrugated | 39.5 | ∓2 | 37.0 |
| SBR latex | 5.0 | ∓1 | 5.0 |
| Asphalt (50% solids emulsion) | 1.0 | ∓0.1 | — |
| ALPHASIZE 120 (50% solids emulsion) | — | ∓0.1 | 1.0 |
| Carbon black dye | 2.0 | ∓0.1 | 2.0 |
| Alum | 70.0 + 5.0 lbs/ton of felt | | |
| Flocculent | 2.0 + 5.0 lbs/ton of felt | | |
| Glass Ball Formulation in in-line process | | | |
| No. of balls after 8 hours | 200 | | 10 |

*based on U.S. Pat. No. 4,543,158

The characteristics of the above dried felt sheets are reported in following TABLE B.

TABLE B

| FORMULATION | A | B |
|---|---|---|
| Weight (lbs/480 sq. ft.) | 27.0 | 19.5 |
| Caliper (1/1000 inches) | 23.0 | 17.0 |

TABLE B-continued

| FORMULATION | A | B |
| --- | --- | --- |
| Tear Strength CMD* (grams-force) | 301 | 340 |
| % Ash Content* | 17.6 | 23.5 |
| % Expansion CMD | 1.0 | 0.5 |
| Foam Adhesion (lbs/sq. inch) | 8.0 | 10.0 |
| Linear feet/roll | 6,600 | 8,700 |

*higher ash % indicates better fire resistance

What is claimed is:

1. A light weight felt composition suitable for siding and roofing underlayment and insulation board facing which comprises, on a dry basis,
    (a) 60–80 wt. % cellulose fibers;
    (b) 15–30 wt. % glass fibers having a diameter not less than 5 and not in excess of 16.5 microns and a fiber length of ⅛–¾ inch;
    (c) 4–10 wt. % binder and
    (d) 0.5–10 wt. % of non-asphaltic water repellant sizing agent having a flash point higher than 150° F. and an evaporation rate less than one which is selected from the group of anionic/rosinous sizes and $C_{16}$ to $C_{30}$ amphipathic sizes and mixtures thereof.

2. The felt of claim 1 wherein said binder is a latex.

3. The felt of claim 2 wherein said latex is SBR.

4. The felt composition of claim 1 wherein the water repellant sizing agent is selected from the group of anionic and cationic sizes and mixtures thereof.

5. The felt composition of claim 1 wherein the sizing agent is an alum/rosin sizing agent.

6. The felt composition of claim 1 wherein the concentration of the sizing agent in the total composition is between about 0.8 and about 2.5 wt. %.

7. The felt composition of claim 1 wherein component (b) has a fiber aspect ratio of between about 600 and about 1450 and a filament diameter of from about 5 to about 16.5μ.

8. The felt composition of claim 7 wherein (b) has a filament diameter of from about 8.8 to about 14μ.

9. The felt composition of claim 1 wherein component (a) is a paper waste containing fibers of at least 50% of 1.5–3.5 millimeter length.

10. The felt composition of claim 9 wherein the paper waste is a mixture of newsprint paper and corrugated Kraft paper having mixed fiber lengths of between about 0.5 and about 1.4 mm short fibers and between about 1.5 and about 3.5 mm long fibers.

11. The felt composition of claim 1 in rolled form and having a weight of between about 15 and about 23 lbs/480 square feet.

12. The aqueous composition of claim 1 additionally containing an adjuvant selected from the group consisting of a flocculant, a defoamer, a coloring agent and/or a defoamer.

13. The composition of claim 1 which additionally contains about 2 lbs of flocculant/ton of (a)+(b)+(c)+(d) and about 70 lbs of alum/ton of (a)+(b)+(c)+(d).

* * * * *